United States Patent
Jung et al.

(10) Patent No.: US 8,386,659 B2
(45) Date of Patent: Feb. 26, 2013

(54) CONFIGURATION ADAPTATION LAYER FOR MAPPING I/O DEVICE RESOURCES

(75) Inventors: Michael Jung, Boeblingen (DE); Hans-Helge Lehmann, Well im Schoenbuch (DE); Elke G. Nass, Boeblingen (DE); Christoph Raisch, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 12/892,651

(22) Filed: Sep. 28, 2010

(65) Prior Publication Data

US 2011/0078337 A1    Mar. 31, 2011

(30) Foreign Application Priority Data

Sep. 30, 2009   (EP) .................................... 09171754

(51) Int. Cl.
*G06F 3/00*    (2006.01)

(52) U.S. Cl. ........................................................... 710/10
(58) Field of Classification Search ..................... 710/10
See application file for complete search history.

(56) References Cited

U.S. PATENT DOCUMENTS

| 7,613,809 B2 * | 11/2009 | Jackson et al. ................. 709/226 |
| 8,065,454 B1 * | 11/2011 | Sonksen et al. ................. 710/72 |

OTHER PUBLICATIONS

"Single Root I/O Virtualization and Sharing Specification, Revision 1.0," Sep. 11, 2007.

* cited by examiner

*Primary Examiner* — Chun-Kuan Lee
(74) *Attorney, Agent, or Firm* — Matthew J. Bussan (57) ABSTRACT

A configuration adaptation layer (CAL) for I/O devices such as I/O adapters is provided. This configuration adaptation layer (CAL) explicitly provides a mapping between adapter functions and adapter resources in a way such that it is senseable in-band by the computer system using the adapter, e.g., by a virtual machine monitor.

3 Claims, 7 Drawing Sheets

Fig. 7 even though the adapter is externally

CONFIGURATION ADAPTATION LAYER FOR MAPPING I/O DEVICE RESOURCES

FIELD

The present invention relates to the mapping of resources of I/O devices to generic resources of a computer system.

BACKGROUND

Figure 1:
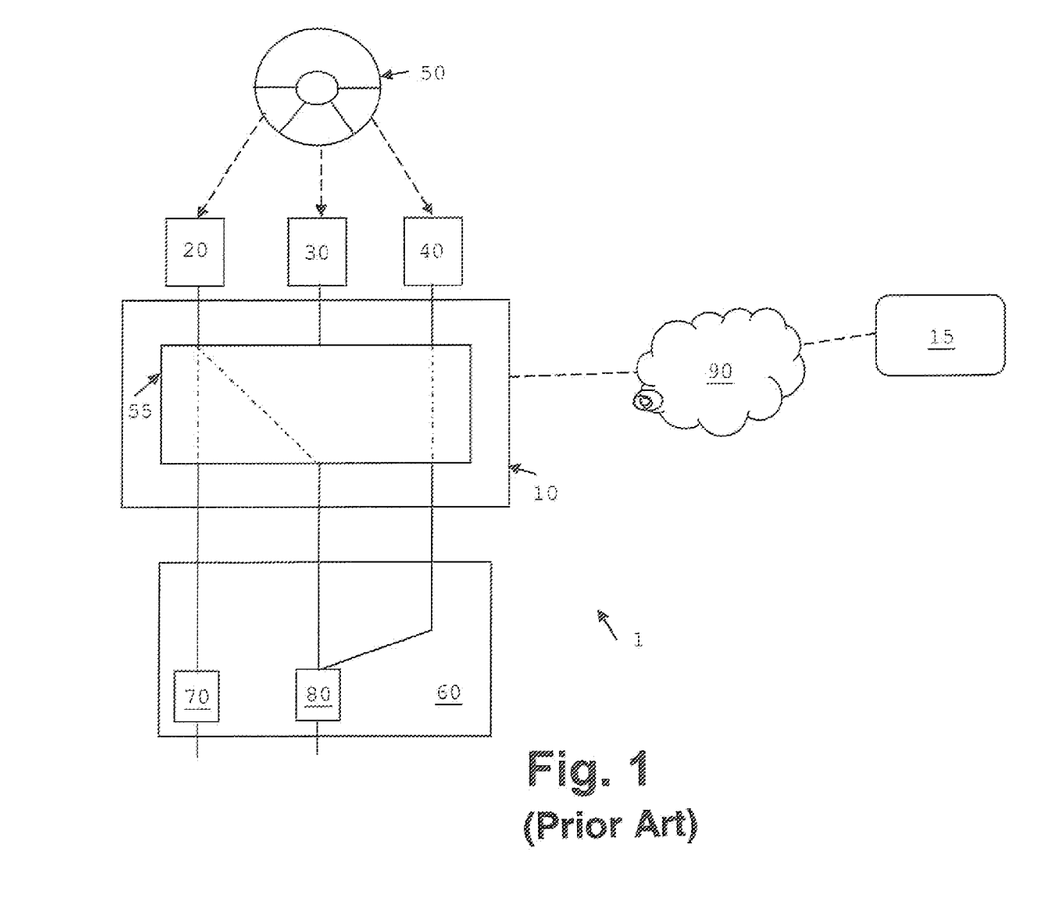
FIG. 1 (Prior Art): Is a block diagram illustrating a computer system.

As shown in FIG. 1, a modern computer system 1 includes a virtual machine manager (VMM) 10 that allows partitioning the computer system resources into multiple virtual machines (VM) 20, 30, 40 and to share resources between such VMs. Media 50 comprises separate drivers for the different operating systems executed in the VMs 20, 30, 40. The VMM 10 is controlled via a management console 15, which is connected to the VMM 10 via a network 90. The assignment of resources to VMs is defined by the system administrator on the management console 15, which results to the configuration 55 of the VMM 10. An adapter 60 adds resources 70 and 80 to the computer system 1. Whether it is supported to share or partition those resources 70 and 80 depends on the capabilities of the adapter 60 and corresponding firmware.

Figure 2:
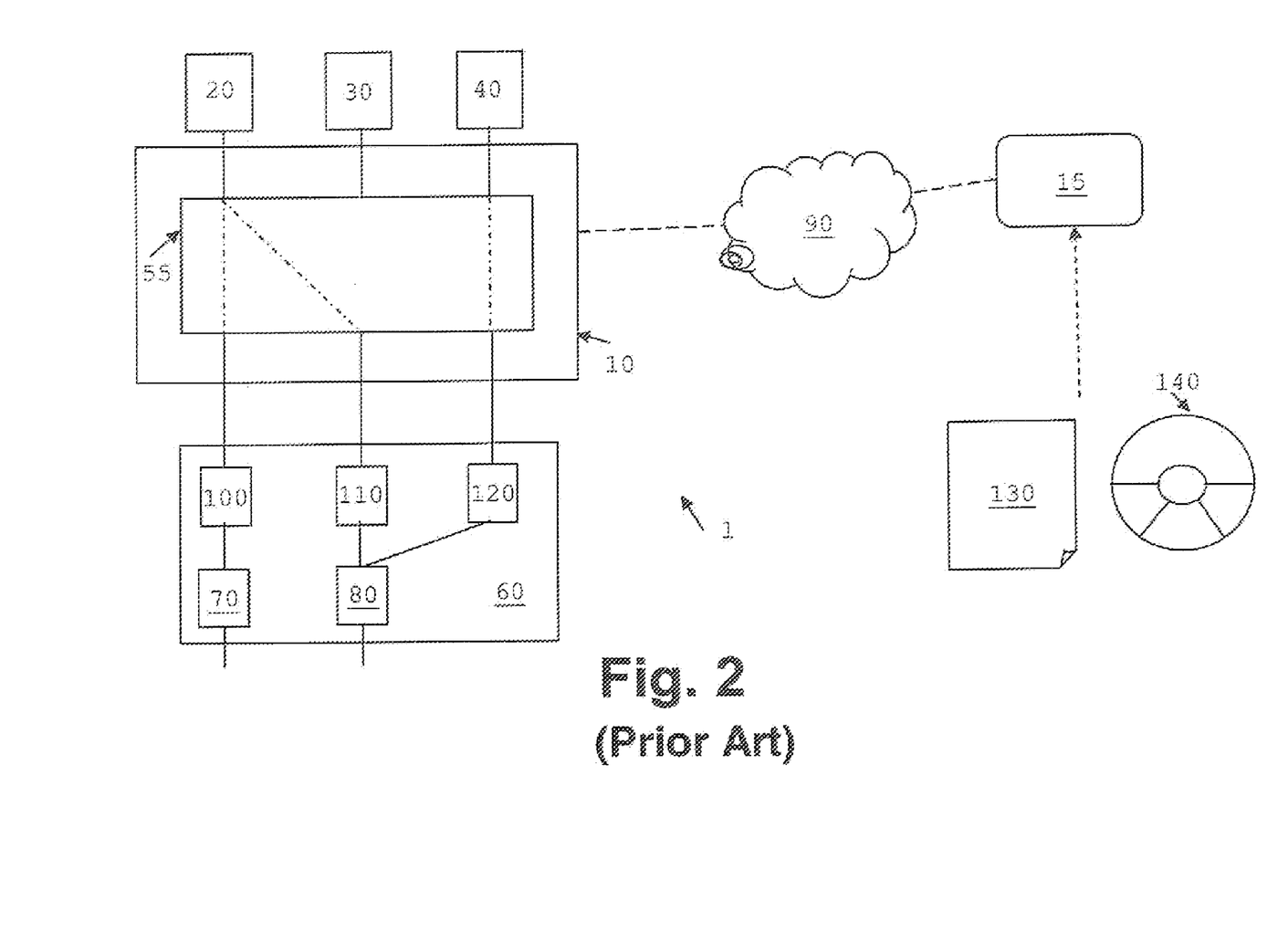
FIG. 2 (Prior Art): Is a block diagram illustrating a computer system.

Resources of Peripheral Component Interconnect (PCI) Express compliant adapters are made accessible to VMs via PCI Express functions (in the following called functions). PCI Express is described in the PCI Express Base Specification, Revision 2.1, Mar. 4, 2009. Each function can be assigned to no more than one VM by the VMM. This is shown in FIG. 2 for the computer system 1 from FIG. 1. The functions 100 and 110 of the adapter 60 are assigned to VM 20. The function 120 is assigned to the VM 40. No functions of the adapter 60 are assigned to the VM 30.

The PCI Express specification defines methods for the VMM to discover the functions provided by a PCI Express adapter. The mapping between adapter resources and adapter functions is established by the vendor of the respective PCI Express adapter. Partitioning of adapter resources is enabled by mapping distinct resources to distinct functions. Sharing of adapter resources is enabled by mapping the same resources to multiple functions. For the adapter 60 in FIG. 2, the functions 100, 110, and 120 can be discovered by the VMM 10. The resource 70 is mapped to the function 100, and the resource 80 is mapped to the functions 110 and 120.

The PCI Express specification does not define methods to discover adapter resources and their respective mapping to functions. For the adapter 60 in FIG. 2, the resources 70 and 80 cannot be discovered by the VMM 10. Thus, in order for the system administrator to be able to assign resources to VMs in the system configuration, the mapping between adapter resources and adapter functions has to be made available by means that are outside the scope of the PCI Express specification. As of today it is state of the art to provide this adapter type specific information via one of the following two methods.

In the first method, this adapter type specific information is provided in human readable form in the adapter reference manual (reference manual 130 in FIG. 2). When creating the configuration 55 for the VMM 10 via the management console 15, the system administrator has to consult the reference manual 130 to select one of the possibly multiple provided functions that correspond to the resource(s) he attempts to assign to a VM. This has the following shortcomings:

The administrator has to express the configuration not in terms of resources, but rather in terms of functions.

New engineering change levels or adapter firmware levels of a supported adapter might change the number of functions and/or their respective mapping to resources, while resources are neither changed in number nor type. In this case, the system administrator has to modify the configuration despite the fact that the adapter is externally equivalent to previous level adapters.

In the second method, the adapter type specific information is provided in a machine comprehendible firmware component that is adapter type specific and has to be installed on a management console; e.g., from a media 140. In this case, the management console 15 will do the mapping from resources to functions; e.g., via a plug-in, which allows for the system administrator to create the system configuration in terms of resources. This has the following shortcomings:

For each new type of adapter a firmware component has to be installed on the management console. Especially in the context of enterprise server systems, which for sake of quality have a very strict distribution process to deliver such firmware components, this is a major concern.

There are two deliverables per adapter, namely the adapter itself and the respective firmware component, resulting in administration complexity due to; e.g., co-requirements between change levels of those deliverables.

SUMMARY

According to one embodiment of the present invention, an I/O device attachable to a computer system is described, the I/O device comprising a configuration adaptation layer for supporting the mapping of resources of the device to generic resources of the computer system.

According to another embodiment of the present invention, a hardware configuration layer for a computer system is described, the hardware adaptation layer comprising at least one I/O device and a configuration adaptation layer for supporting the mapping of resources of the devices to generic resources of the computer system.

According to another embodiment of the present invention, a method and a corresponding computer program and a corresponding computer program product for initializing a hardware adaptation layer for I/O devices and/or an I/O device in a computer system is described, comprising the steps:

searching for attributes in the configuration adaptation layer;

searching for generic resources using the attributes.

DETAILED DESCRIPTION

Figure 3:
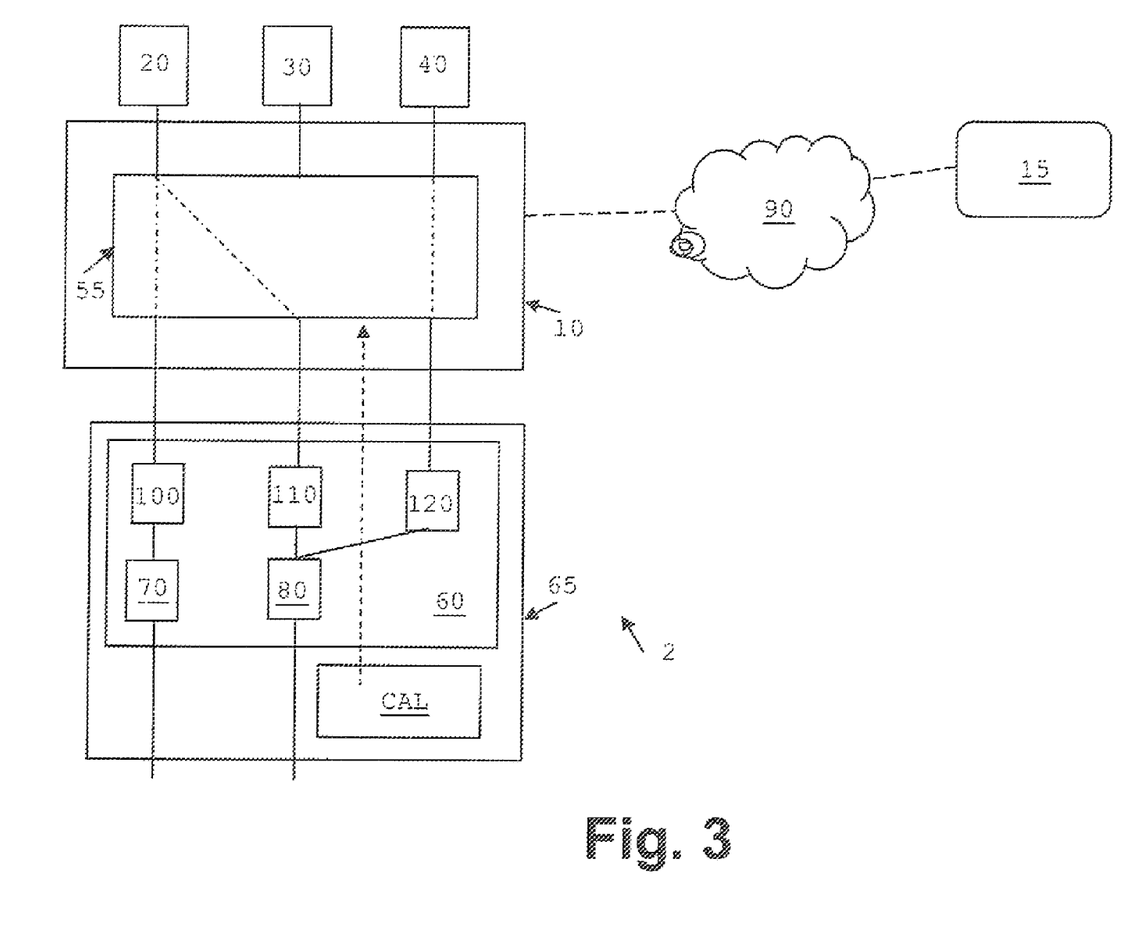
FIG. 3: Is a block diagram illustrating a computer system in accordance with the present invention.

Enterprise server systems do not typically exhibit standard PCI Express slots, but rather rely on a hardware adaptation layer in form of a hardware packaging that provides enhanced physical robustness and functionality. This hardware packaging might host any number of PCI Express adapters integrated via standard compliant PCI Express switches and connectors. Alternatively, the packaging of a printed circuit board might directly host PCI Express compliant integrated circuits. FIG. 3 illustrates a computer system 2 with a hardware adaptation layer 65. The computer system 2 is a modification of the computer system 1 shown in FIGS. 1 and 2, where the adapter 60 is plugged into a slot of a hardware adaptation layer 65. The hardware adaptation layer 65 comprises the resources 70 and 80 and the functions 100, 110, and 120 of the adapter 60 from FIGS. 1 and 2.

According to the invention a configuration adaptation layer CAL is used, which is integrated with the hardware adaptation layer 65. This configuration adaptation layer CAL explicitly provides the mapping between adapter functions and adapter resources in a way such that it is sense-able in-band by the VMM 10. This addresses all the shortcomings of the current state of the art:

- The system administrator can express the configuration in terms of resources. He does not have to do so in terms of functions.
- New engineering change levels or adapter firmware levels of supported adapters will be distributed with a corresponding new level of the configuration adaptation layer. If such an adapter is plugged as replacement for a lower level adapter of the same type the configuration does not have to be modified.
- Supporting new type of adapters does not require the installation of an adapter type specific firmware component on the management console. Instead, the management console functionality to create the configuration is designed to be generic.
- Integration of configuration and hardware adaptation layers results in a single distributable per adapter, avoiding administration complexity of the kind mentioned above.

In the preferred embodiment of the invention, the configuration adaptation layer is implemented in form of a simple configuration mapping store, which is integrated with the hardware adaptation layer. For example, such non-volatile storage can be implemented as an SEEPROM: Serial Electrically Erasable Programmable Read Only Memory. The PCI Express standard defines the usage of SEEPROMs on PCI Express devices to store a BIOS (Basic Input Output System) or boot code for a network boot operation. This configuration mapping store, which is written only at card manufacturing time, contains a table that enumerates the resources provided by the adapter and provides the mapping to their corresponding functions. This information can be accessed in-band by the VMM.

Figure 4:
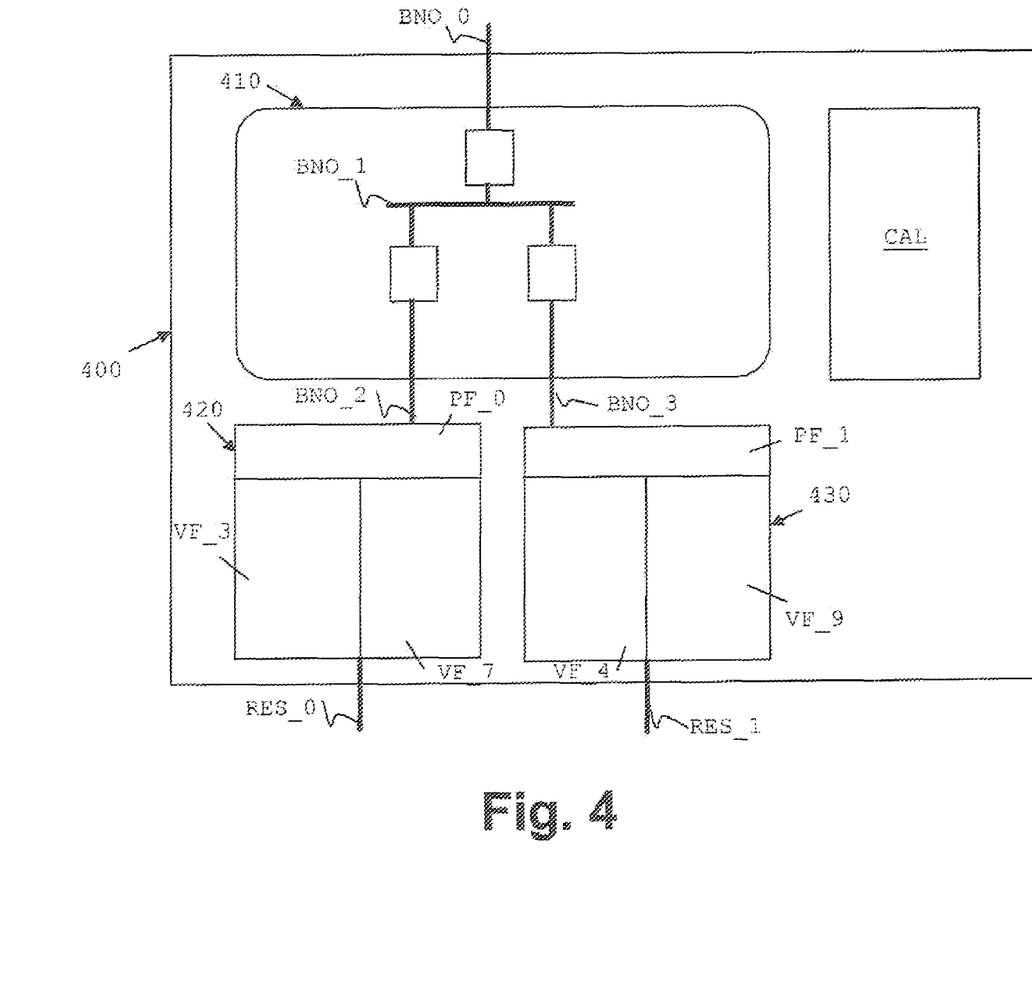
FIG. 4: Is a block diagram illustrating a hardware adaptation layer in accordance with the present invention.

FIG. 4 gives an example of a specific instance of a hardware adaptation layer 400 that integrates a PCI Express switch 410 and two PCI Express adapters 420 and 430 together with a configuration adaptation layer CAL. This hardware adaptation layer 400 provides two physical resources RES_0 and RES_1 (e.g., two ethernet ports). The physical resource RES_0 is connected to the PCI Express adapter 420 and the physical resource RES_1 is connected to the PCI Express adapter 430. The adapter 420 comprises a physical function PF_0 and two virtual functions VF_3 and VF_7 as defined by PCI Express Single Root I/O Virtualization and Sharing Specification (Revision 1.0, Sep. 11, 2007). The adapter 430 comprises a physical function PF_1 and two virtual functions VF_4 and VF_9. The PCI Express switch 410 comprises four busses BNO_0, BNO_1, BNO_2 and BNO_3.

Each one of the resources RES_0 and RES_1 can be shared by a maximum of two VMs by having the VMM assign the two virtual functions available per resource to different VMs. Different virtual functions which provide access to the same physical adapter resource could do so in distinguishable and not configurable ways (e.g., different quality of service characteristics). While this would not be in conflict with the PCI Express Single Root I/O Virtualization and Sharing Specification, this should be an unusual case only. If the overall design assumption for the computer system is to not support such kind of card then the VMM can select an arbitrary virtual function which provides access to the respective resource.

For each resource assignment the system administrator specifies in the system configuration:

- The virtual machine (VM) that shall be granted access to a particular resource;
- The physical location (e.g. the slot) into which the card that this particular resource belongs to is plugged;
- The resource on the card that that the administrator attempts to assign;
- Depending on the particular embodiment of the invention, the system administrator might or might not have to specify a particular shared instance (SI) of the resource.

Figure 5:
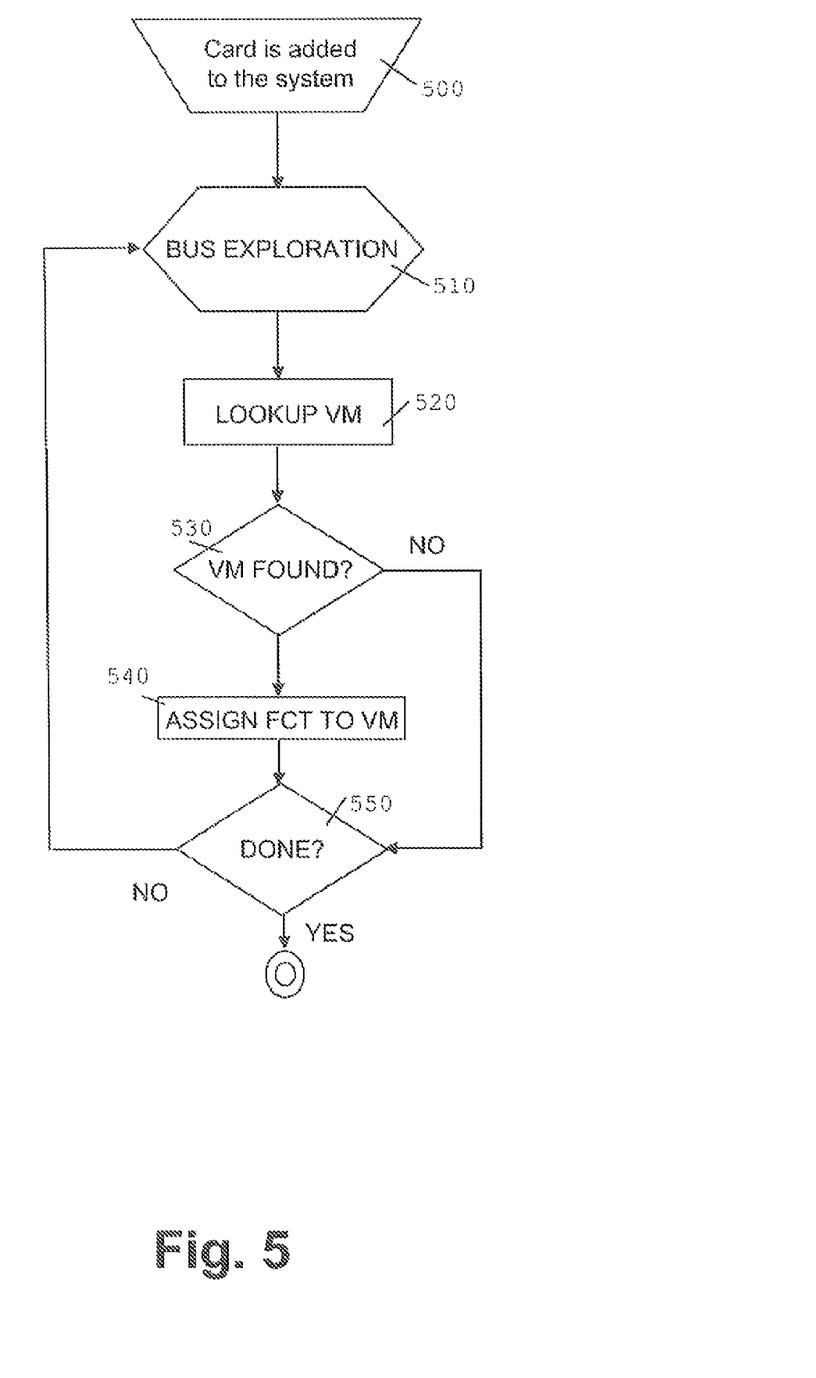
FIG. 5: Is a flow diagram illustrating a prior art initialization method for a hardware adaptation layer.

For example, for FIG. 5 this specification leads to the following table stored in the configuration adaptation layer CAL:

| RESOURCE | SHARED INSTANCE | Bus Number Offset | PCI Express Function Number |
|----------|----------------|-------------------|-----------------------------|
| 0 | 0 | 2 | 3 |
| 0 | 1 | 2 | 7 |
| 1 | 0 | 3 | 4 |
| 1 | 1 | 3 | 9 |

The resources RES_0 and RES_1 are encoded as 0 and 1 respectively. Both resources are assigned to the shared instances 0 and 1. The virtual functions VF_3, VF_7, VF_4, and VF_9 are encoded with their PCI Express function numbers 3, 7, 4, and 9 respectively. A PCI Express function number might encode either a plain function, a physical function, or a virtual function. The bus number offset is defined as the difference between the bus number currently considered by the initialization method for the hardware adaptation layer 400 and the base bus number BUS#(SLOT), which corresponds to a specific slot per system design for the hardware adaptation layer 400.

Instead of identifying resources by integer numbers, in another embodiment of the invention resources are identified by text strings; e.g., EBCDIC (Extended Binary Coded Decimals Interchange Code) encoded, in both the system configuration as well as in the configuration adaptation layer. This way the system administrator would identify resources by names such as e.g. "TOP_ETHERNET_PORT" and "BOTTOM_ETHERNET_PORT".

FIG. 5 illustrates a state of the art method for assigning resources of a hardware adaptation layer to VMs. The method can be performed by a VMM. In step 500 a new adapter card is added to the computer system by inserting it into a slot in the hardware configuration layer. Then, in step 510, the VMM explores the busses in the PCI express switch in depth first order and assigns a bus number to the busses. The numbering starts with a base bus number, which corresponds to a specific slot in the computer system design. In the case of FIG. 4, the specific slot is assigned with bus BNO_0.

Then, for all detected PCI express devices and for all detected PCI Express functions on the detected devices, step 510 will perform step 520. In step 520, a lookup operation for the VM will be performed in the configuration of the VMM. For this lookup operation, the PCI Express function number, the slot number and the bus number offset (BNO) are used. The BNO is the difference between the bus number of the bus, which is currently processed, and the base bus number. For example, for the busses shown in FIG. 4, the BNO is defined as follows: For BNO_0 it is 0, for BNO_1 it is 1, for BNO_2 it is 2, and for BNO_3 it is 3.

In step 530, it will be tested if configuration data is found by the lookup operation in step 520. If configuration data was found, then in step 540 the PCI Express function is assigned to the VM. Otherwise, the processing continues with step 550, which will also be performed after step 540. In step 550, it will be determined if all detected PCI Express functions on a PCI Express device have been processed already and/or if all detected PCI Express devices have been processed already. If this is not the case, then the processing in step 510 continues with the next function or device.

Figure 6:
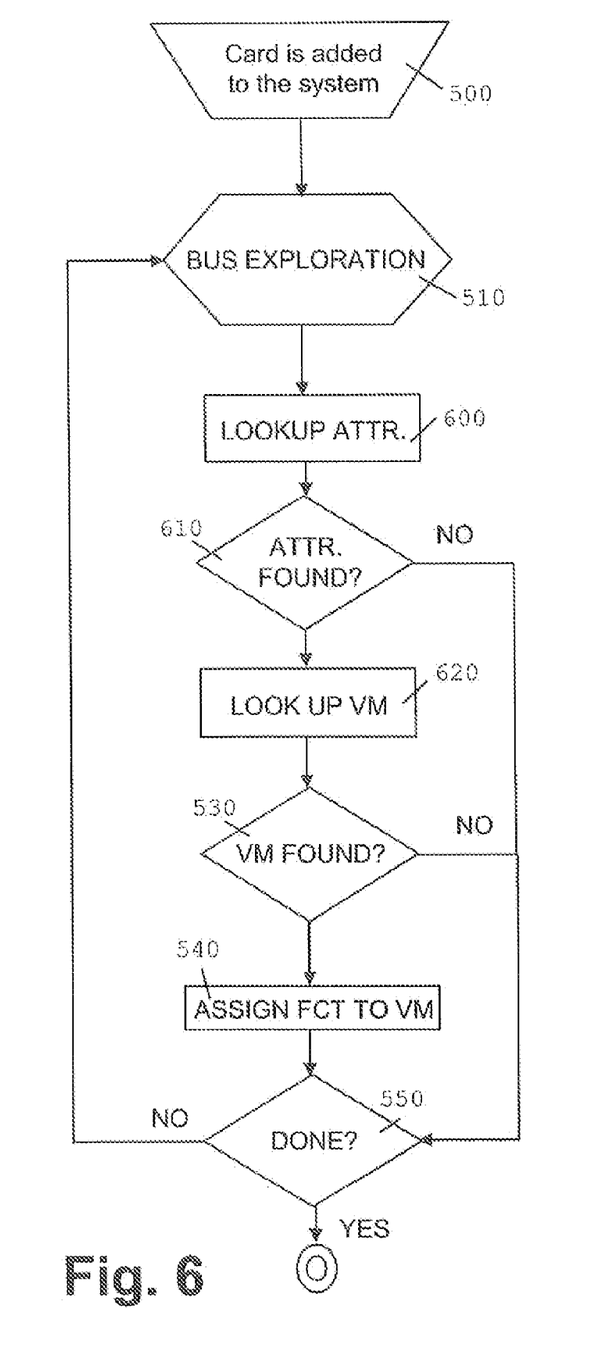
FIG. 6: Is a flow diagram illustrating the initialization method of FIG. 5 modified in accordance with the present invention.

FIG. 6 illustrates the method of FIG. 5 modified in accordance with the present invention. In the preferred embodiment of the invention, the method is performed by a VMM. Step 520 of FIG. 5 is replaced by step 600. In step 600, a lookup operation (e.g., searching) is performed for attributes of resources and shared instances in the configuration adaptation layer. For this lookup operation, the BNO and PCI Express function number is used. In step 610, it will be determined if attributes have been found in the configuration adaptation layer. If this is not the case, then the processing continues with step 550. Otherwise, a lookup operation for the VM in the configuration of the VMM is performed in step 620. For this lookup operation, the attributes for the resource and the shared instance found in step 600 will be used together with the slot number. As in the method of FIG. 5, the processing continues then with step 530.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 7:
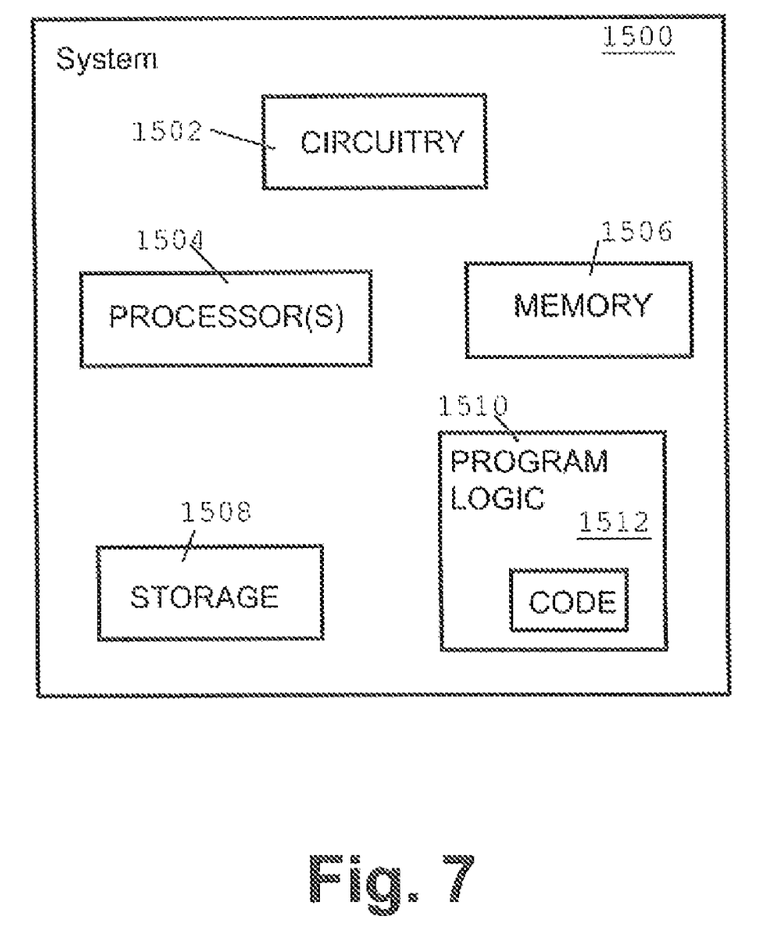
FIG. 7: Is a block diagram of a system in which certain embodiments may be implemented.

FIG. 7 illustrates a block diagram of a computer system 1500 in which certain embodiments may be implemented. The system 1500 may include a circuitry 1502 that may in certain embodiments include a microprocessor 1504. The computer system 1500 may also include a memory 1506 (e.g., a volatile memory device), and storage 1508. The storage 1508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1508 may comprise an internal storage device, an attached storage device and/or a network accessible storage device. The system 1500 may include a program logic 1510 including code 1512 that may be loaded into the memory 1506 and executed by the microprocessor 1504 or circuitry 1502. In certain embodiments, the program logic 1510 including code 1512 may be stored in the storage 1508. In certain other embodiments, the program logic 1510 may be implemented in the circuitry 1502. Therefore, while FIG. 9 shows the program logic 1510 separately from the other elements, the program logic 1510 may be implemented in the memory 1506 and/or the circuitry 1502.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An I/O device attachable to a computer system, wherein the computer system comprises at least one virtual machine (VM) and a virtual machine monitor (VMM), comprising:
    a configuration adaptation layer (CAL) supporting the mapping of resources of the I/O device to the at least one VM of the computer system, wherein the CAL of the I/O device comprises a non-volatile storage with mapping data, wherein the mapping data describes the assignment of the resources of the I/O device to PCI Express functions of the I/O device and is accessible by the VMM, wherein the PCI Express functions of the I/O device can be used by the at least one VM, and wherein the VMM searches for attributes in the CAL of hardware adaption layer and uses the attributes for searching the at least one VM.

2. A method for initializing a hardware adaptation layer attached to a computer system, wherein the hardware adaptation layer comprises an I/O device, and wherein the computer system comprises at least one virtual machine (VM) and a virtual machine monitor (VMM), the method comprising the steps of:
    a) searching, performed by the VMM, for attributes in a configuration adaptation layer (CAL) of the hardware adaptation layer, wherein the CAL supports mapping of resources of the I/O device to the at least one VM of the computer system, wherein the CAL comprises a non-volatile storage with mapping data, wherein the mapping data describes the assignment of the resources of the I/O device to PCI Express functions of the I/O device, wherein the PCI Express functions of the I/O device can be used by the at least one VM, and wherein the mapping data is accessible by the VMM;
    b) searching, performed by the VMM, for one or more of the at least one VM using the attributes.

3. A computer program product comprising a computer recordable medium storing program instructions executable by a computer, the stored program instructions comprising a computer program performing a method for initializing a hardware adaptation layer attached to a computer system, wherein the hardware adaptation layer comprises an I/O device, and wherein the computer system comprises at least one virtual machine (VM) and a virtual machine monitor (VMM), the method comprising the steps of:
    a) searching, performed by the VMM, for attributes in a configuration adaptation layer (CAL) of the hardware adaptation layer, wherein the CAL supports mapping of resources of the I/O device to the at least one VM of the computer system, wherein the CAL comprises a non-volatile storage with mapping data, wherein the mapping data describes the assignment of the resources of the I/O device to PCI Express functions of the I/O device, wherein the PCI Express functions of the I/O device can be used by the at least one VM, and wherein the mapping data is accessible by the VMM;
    b) searching, performed by the VMM, for one or more of the at least one VM using the attributes.

* * * * *